Dec. 1, 1964
G. F. METZ
3,159,792
REVERSIBLE COUNTER CIRCUIT WITH MEANS FOR
DETECTING A PREDETERMINED TOTAL COUNT FOR
CONTROLLING COUNTER REVERSAL
Filed Sept. 5, 1961
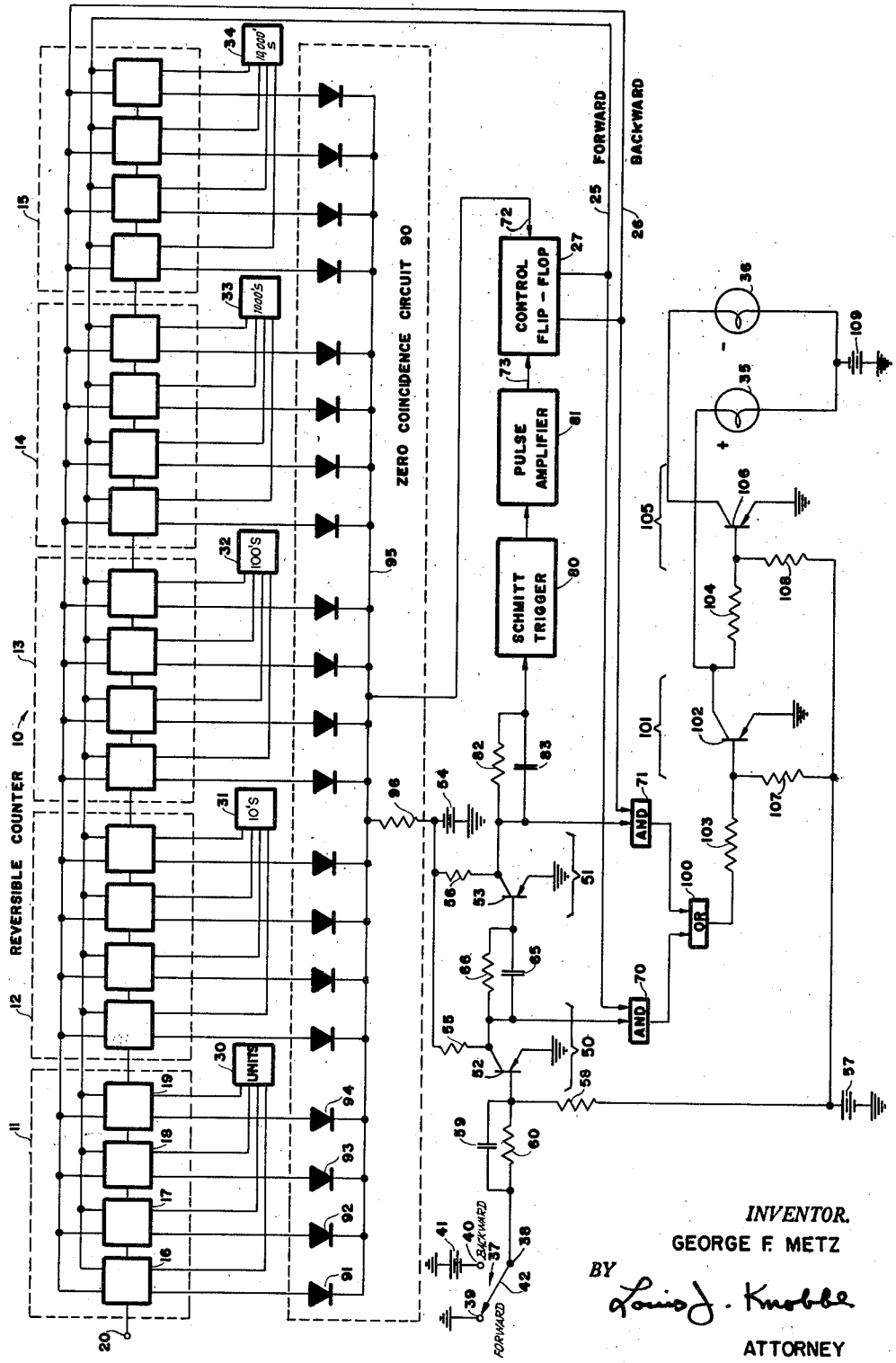
INVENTOR.
GEORGE F. METZ
BY *Louis J. Knobbe*
ATTORNEY

United States Patent Office 3,159,792
Patented Dec. 1, 1964

3,159,792
REVERSIBLE COUNTER CIRCUIT WITH MEANS FOR DETECTING A PREDETERMINED TOTAL COUNT FOR CONTROLLING COUNTER REVERSAL
George F. Metz, Richmond, Calif., assignor to Beckman Instruments, Inc., a corporation of California
Filed Sept. 5, 1961, Ser. No. 135,962
10 Claims. (Cl. 328—44)

The present invention relates generally to reversible counter systems and, more particularly, to a reversible counter system which displays the output result as an algebraic value.

In the present state of the art, there are many uses for electronic digital counters. Such counters, for example, can be used for any application in which a suitable transducer produces voltage changes which represent the occurrence of physical events. Examples of laboratory and industrial applications include precision tachometry; measurement of pressure, flow, temperature, viscosity, velocity, and frequency; process control; data reduction systems; calibration of frequency generating equipment; and measurement of practically any electrical, mechanical, optical or other physical event.

Frequently, it is desirable or necessary to count in both a forward and backward direction so as to both add and subtract reoccurring physical events. Although electronic reversible digital counters are known in the art, they usually operate so as to display the complement of the actual number of events counted. By way of example, a five decimal digit reversible counter will display all nines (99999) for the first backward count after zero. Some applications require, however, an output indicative of the algebraic value of the output, i.e., the true absolute value and its polarity sign. For example, a five decimal digit reversible counter so constructed would read —00001 for the first backward count after zero. It is desirable that this type of readout should not be gained by sacrificing the speed or flexibility of the reversible counter.

Accordingly, it is a primary object of this invention to provide an improved reversible counter which displays the output result as an algebraic value.

A further object of this invention is to provide a reversible counter having an algebraic value output which does not reduce the speed or flexibility of the counter circuitry.

It is another object of this invention to provide a reversible counter in which input signals to be added and subtracted may be applied to a single input.

Other and further objects, features and advantages of the invention will become apparent as the description proceeds.

Briefly, in accordance with a preferred form of the present invention, a reversible counter having a single input terminal for both additive and subtractive input signals includes a detection circuit for detecting a count of zero therein. The output of this detection circuit as well as a selector for preselecting the forward and backward counting modes determine in which direction the counter operates. In addition, positive and negative polarity readout devices are controlled thereby so that the positive polarity indicating device is ON when the forward counting mode is preselected and the counter stages are counting in a forward manner or when the backward counting mode is preselected and the counter stages are counting in a backward manner. The negative polarity indicating device is rendered ON for the respectively opposite conditions.

A brief numerical example will further clarify the foregoing description. Assuming that the counter registers +10, if a single input signal is applied to the counter while in the forward counting mode, the counter will, of course, count in a forward direction and the ON positive polarity indicating device will properly indicate a +11. If an additional count is then applied to the counter with the counting mode changed to the backward mode, the counter will count in a backward direction and the ON positive polarity indicating device will properly indicate a +10. If, however, the counter initially registers a —10 and a single input signal is applied to the counter while in the forward counting mode, the counter must count in a backward direction to properly count the input signal. The negative indicating device then must remain ON to indicate the result of —9. If an additional count is then applied to the counter with the counting mode changed to the backward mode, the counter must count in a forward direction. The negative indicating device must then remain ON to indicate the result of —10.

A more thorough understanding of the invention may be obtained by a study of the following detailed description taken in connection with the accompanying drawing in which is shown a schematic diagram of a reversible counter system constructed in accordance with the present invention.

Referring now to the figure, there is shown a preferred embodiment of this invention including a reversible counter 10. A complete schematic for this type of counter is not shown and described herein since it is well known in the art, a preferred counter of the decimal type being described in the copending application Serial No. 51,878 of Thomas H. Thomason entitled Reversible Decimal Counter, filed August 25, 1960, and copending application Serial No. 51,970 of Hamilton C. Chisholm et al. entitled Reversible Decimal Counter, filed August 25, 1960, each of which are assigned to Beckman Instruments, Inc., assignee of the present invention. Counter decades 11, 12, 13, 14 and 15 constructed in accordance with these applications each include four binary counting units, of which units 16, 17, 18 and 19 are representative, interconnected to selectively count in forward and backward directions. Both the forward and backward input signals are connected to an input terminal 20 which is directly connected to the input of unit 16. In a decimal type counter, each decade is modified to count in a binary decimal code. Thus, counter decade 11 records the value of the units decimal digit, counter decade 12 records the value of the tens decimal digit and counter decades 13, 14 and 15 respectively record the values of the hundreds, thousands and ten thousands decimal digits. The illustrated five decade counter may thus register any number between 0 and 99,999. Counter decades constructed in accordance with the foregoing described applications are controlled to count in both a forward and backward direction by preselected voltage levels introduced on forward control line 25 and backward control line 26. In the counting system shown in the figure, these voltages are supplied by control binary flip-flop 27. In the following description, it will be assumed that a negative potential on forward conductor 25 causes reversible counter 10 to count in a forward direction and that a negative potential on backward conductor 26 causes reversible counter 10 to count in a backward direction.

Before describing the structure and operation of the circuitry shown, the type of output information desired will be briefly described. Basically, the function of the system shown is to provide a reversible counter which displays the output result as an algebraic value. The absolute value of the output result is read in normal fashion by readout devices 30, 31, 32, 33 and 34 respectively connected to the counting decades 11–15 and constructed, for example, in accordance with the teachings of copending application Serial No. 802,492 of Hamilton C. Chisholm entitled Count Indicator, filed March 27, 1959, and copending application Serial No. 14,835 of Carl L. Isborn entitled Logic Systems, filed March 4, 1960, each of which is assigned to Beckman Instruments, Inc.

The polarity of the output result is indicated by the energization of suitable readout devices such as incandescent lamp 35 which when energized indicates a positive polarity and incandescent lamp 36 which when energized indicates a negative polarity. These lamps are selectively energized according to the counting mode selected by switch 37 and the state of the control flip-flop 27. As shown, mode selector switch 37 may comprise a single-pole double-throw switch having a first terminal 38 connected to grounded terminal 39 for counting in a forward direction or to a terminal 40 connected to negative potential source 41 for counting in a backward direction, each counting mode being selected by moving movable contact 42.

It will be apparent to those skilled in the art that other components known in the art may be substituted for switch 37. By way of example, the mode selector may be controlled by electrical input signals coupled to relay switches or transistor or vacuum tube switches.

The positive indicating lamp is designed to be energized as long as the input signals are greater than zero, i.e., either switch 37 has been in the "Forward" position for all of the input signals or pulses applied to the input terminal 20 or the number of input signals applied to terminal 20 when the selector switch 37 has been in the "Backward" position is less than when the switch has been in the "Forward" position. The negative indicating lamp is designed to be energized for the respectively opposite conditions, i.e., either switch 37 has been in the "Backward" position for all of the signals applied to input terminal 20 or the number of signals applied to input terminal 20 when the switch has been in the "Forward" position is less than when the switch has been in the "Backward" direction. The circuitry and operation thereof for achieving the desired control over the lamps 35 and 36 will now be described in detail.

Immediately connected to the terminal 38 of mode selector switch 37 is a circuit for providing mutually exclusive signals determined by the preselected counting mode. The circuit shown includes first and second inverter amplifiers 50 and 51 in which respective p-n-p transistors 52 and 53 have their emitters grounded and their collectors connected to a source 54 of negative potential via respective coupling resistors 55 and 56. A suitable bias level is provided on the base of transistor 52 by positive potential source 57 via bias resistor 58. Switch 37 is connected to the base of transistor 52 which serves as the input of the first inverter amplifier 50 via a coupling circuit comprising parallel connected capacitor 59 and resistor 60. Similarly, the collector of transistor 52 which serves as the output of the first inverter amplifier 50 is connected to the base of transistor 53 which serves as the input of the second inverter amplifier 51 via a coupling circuit comprising parallel connected capacitor 65 and resistor 66. Also, as shown, the output of the first inverter amplifier 50 is connected to an input of AND gate 70 and the collector of transistor 53 which serves as the output of the second inverter amplifier 51 is connected to an input of AND gate 71.

In operation, the cascaded inverter amplifiers provide respectively opposite potential levels at their outputs depending upon the counting mode preselected by switch 37. Thus, when the switch selects the "Forward" counting mode, the base of transistor 52 is positively biased so as to thereby reverse bias the emitter-base junction of this transistor. Transistor 52 is then nonconductive and the negative potential of source 54 appears at the output of the first inverter amplifier. This potential applied to the base of transistor 53 causes conduction thereof. As a result, approximately ground potential appears at the output of the second inverter amplifier. By moving the movable contact 42 of switch 37 to terminal 40 and thereby select the "Backward" counting mode, the potentials at the respective outputs of the inverter amplifier are reversed since transistor 52 then conducts thus grounding the output of the first inverter amplifier. This, of course, raises the potential at the base of transistor 53 so as to turn this latter transistor off thus changing the potential at the output of the second inverter amplifier to approximately the negative potential of source 54.

AND gates 70 and 71 are responsive to simultaneous negative inputs. Thus, AND gate 70 will provide a negative potential output when the forward counting mode is selected and a negative potential applied to forward conductor 25. Similarly, AND gate 71 will provide a negative output signal when the backward counting mode is selected and a negative potential applied to backward conductor 26. A negative potential is applied to forward conductor 25 when control flip-flop 27 is in its reset state or binary "0" state. This is one of the alternative stable states of the flip-flop and occurs whenever a negative signal is applied to reset input terminal 72 and whenever a trigger signal is applied to trigger input terminal 73 when the flip-flop is in its opposite or binary "1" state. Flip-flop 73 may be constructed in any of the numerous ways presently known in the art. A representative circuit, for example, incorporates a pair of transistors so cross-coupled that the transistors are retained in mutually exclusive states of conduction and nonconduction.

Interconnected between the output of the second inverter amplifier and the trigger input 73 of the control flip-flop 27 is a Schmitt trigger circuit 80 and pulse amplifier 81 for providing a trigger input signal to control flip-flop 27 each time the mode selector switch 37 is actuated to select a different counting mode. Each time a different counting mode is selected, the potential change at the output of the second inverter amplifier is coupled to the input of the Schmitt trigger via a coupling circuit comprising parallel connected resistor 82 and capacitor 83. The Schmitt trigger 80 is designed to trigger each time the potential changes at the output of the second inverter amplifier. The output of this circuit is shaped by pulse amplifier 81 to provide a suitable trigger input signal for the control flip-flop 27. In view of the potential levels presupposed for controlling the direction of the reversible counter, binary flip-flop 27 in its reset or binary "0" state causes counter 10 to count in a forward direction whereas flip-flop 27 in its binary "1" state causes counter 10 to count in its backward direction. Also, it may be noted that the potentials provided at the output of repsective inverter amplifiers 50, 51 and control flip-flop 27 cause AND gate 70 to supply a negative output signal when the "Forward" counting mode is preselected and flip-flop 27 is in its binary "0" state. AND gate 71 is caused to provide a negative output signal for the respectively opposite operating conditions, namely, when a "Backward" counting mode is preselected and control flip-flop 27 is in its binary "1" state.

Connected to the reset input 72 of flip-flop 27 and adapted for applying a negative reset signal thereto when reversible counter 10 registers zero is the zero coincidence circuit 90 comprising a plurality of gating diodes of which diodes 91, 92, 93 and 94 are exemplary. The anodes of each of these diodes are respectively connected to binary counting units of the respective decimal decades 11, 12, 13, 14 and 15. The cathodes of each of these diodes are connected to conductor 95. This conductor will thus be maintained at substantially ground potential so long as any one of the gating diodes is connected to the grounded output of a counting unit. This condition will prevail so long as the count in the reversible decimal counter is different than zero. When, however, a zero count is recorded in the counter, each and every one of the gating diodes is connected to a source of negative potential whereupon conductor 95 is negatively biased by negative potential source 54 connected thereto by coupling resistor 96. A negative potential is then applied to the reset input of control flip-flop 27 which immediately resets to its binary "0" state and is so maintained until after the next input signal. Thus, the reversible counter 10 is forced to count in a forward direction for the succeeding input signal applied at terminal 20 regardless of the counting mode selected by switch 37. Zero coincidence circuit 90 thereby insures that the reversible counter 10 will always count in a forward direction immediately after registering a count of zero thereby positively preventing the counter from registering the complement of the actual value as it would normally do if a backward counting mode was selected for the count succeeding a count of zero.

The outputs of AND gates 70 and 71 are connected to respective inputs of an OR gate 100 connected to the input of a first lamp driver stage 101 comprising transistor 102. As shown, the base of this transistor is connected to the output of OR gate 100 via coupling resistor 103. The output collector of this first driver stage is connected via coupling resistor 104 to the input base of a second lamp driver circuit 105 comprising transistor 106 also having its emitter grounded. The bases of both transistors are connected to positive potential source 57 via respective bias resistors 107, 108. The output collector of the first driver is also connected to the positive polarity indicating lamp 35 and the output collector of the second lamp driver is connected to the negative polarity indicating lamp 36. The other terminals of these lamps are connected together to a negative potential power source 109 as shown. When no signal is provided at the output of OR gate 100, the emitter-base junction of transistor 102 is reverse biased by positive potential source 57. The collector of this transistor is then negatively biased by negative potential source 109 with the result that transistor 106 is biased into its state of conduction and the negative polarity indicating lamp 36 is then energized. It will be apparent that the second lamp driver 105 functions as an inverter amplifier. When, however, an input signal is applied to OR gate 100, a negative potential signal appears at its output thereby causing transistor 102 to conduct at which time the positive polarity indicating lamp 35 is energized. The base of transistor 106 is then grounded so as to place this transistor in its state of nonconduction thereby extinguishing the negative polarity indicating lamp 36. It will thus be observed that the second lamp driver 105 functions as an inverter amplifier thereby maintaining lamps 35, 36 in respecitvely opposite states of ON and OFF. Thus, the negative polarity indicating lamp is energized when neither of the AND gates 70, 71 provide signals at their respective outputs, i.e., it is energized when the forward counting mode has been selected and the control binary flip-flop 27 causes the counter to count in a backward direction or when a backward counting mode has been selected and the control binary flip-flop causes the counter to count in a forward direction. The positive polarity lamp is selectively energized when either of the AND gates 70, 71 provide an output at their respective outputs, i.e., a forward counting mode has been selected and the control binary flip-flop causes the counter to count in a forward direction or when a backward counting mode has been selected and the control binary flip-flop causes the counter to count in a backward direction.

It is to be understood that the particular signal parameters specified hereinabove for the inverter amplifiers 50, 51, control flip-flop 27, AND gates 70, 71, zero coincidence circuit 90 and lamp drivers 101, 105 are merely by way of specific example only and are not to be taken by way of limitation. Thus, it will be apparent to those skilled in the digital circuitry art that these elements may be designed to operate with different signals than those specified hereinabove while still providing the same function. Also, it will be obvious to those skilled in the art that n-p-n transistors, vacuum tubes and like electronic circuit components may be substituted in the reversible counter system shown.

By way of further explanation, the operation of the system shown for a representative counting cycle will be described below. For convenience, the state of several of the circuit components are tabulated in the following table:

| Input pulse | Counting mode | First inverter amp .50 output | Second inverter amp .51 output | Control binary flip-flop 27 Left | Control binary flip-flop 27 Right | AND gate 70 | AND gate 71 | Reversible counter 10 | Polarity sign lamp 35, + or lamp 36, − |
|---|---|---|---|---|---|---|---|---|---|
| 0 | | | | Ground | Negative | | | 00000 | |
| 1 | Forward | Negative | Ground | Ground | Negative | Negative | | 00001 | + |
| 2 | Forward | Negative | Ground | Ground | Negative | Negative | | 00002 | + |
| 3 | Forward | Negative | Ground | Ground | Negative | Negative | | 00003 | + |
| 4 | Backward | Ground | Negative | Negative | Ground | | Negative | 00002 | + |
| 5 | Backward | Ground | Negative | Negative | Ground | | Negative | 00001 | + |
| 6 | Backward | Ground | Negative | Negative | Ground | | | 00000 | |
| | | | | Ground | Negative | | | | − |
| 7 | Backward | Ground | Negative | Ground | Negative | | | 00001 | − |
| 8 | Backward | Ground | Negative | Ground | Negative | | | 00002 | − |
| 9 | Forward | Negative | Ground | Negative | Ground | | | 00001 | − |
| 10 | Forward | Negative | Ground | Negative | Ground | | | 00000 | |
| | | | | Ground | Negative | Negative | | | + |
| 11 | Forward | Negative | Ground | Ground | Negative | Negative | | 00001 | + |

In the above table, the first column labeled "Input Pulse" represents successive pulses that may be applied to reversible counter input terminal 20. The second column labeled "Counting Mode" represents the position of the selector switch 37. The third and fourth columns respectively indicate the potentials supplied the output of the first and second inverter amplifiers 50, 51. The fifth column labeled "Control Binary Flip-flop 27" indicates the potentials applied to the left and right-hand outputs of this element. The sixth and seventh columns show the potentials applied at the outputs of respective AND gates 70 and 71. The eighth and ninth columns respectively show the absolute value recorded in the reversible counter 10 and the polarity indicated by the indicating lamps 35 and 36.

As shown, the counter is assumed to initially register a count of zero. The control flip-flop is then maintained in its binary "0" state so as to apply a negative potential to forward control line 25 thereby forcing counter 10 to count the succeeding count in a forward direction.

In the example given, the forward counting mode is selected for the first input pulse. The base of the first inverter amplifier is then grounded and a negative potential appears at its output. Previously, the zero detection circuit has caused the control binary flip-flop to provide ground and negative potentials respectively on the left and right-hand outputs thereof so as to cause the reversible counter to count in a forward direction. Since AND gate 70 is supplied with negative potentials from inverter amplifier 50 and the righthand output of the control flip-flop 27, a negative potential is supplied at its output. As a result, the positive polarity indicator lamp 35 is energized. An algebraic value of +1 is thus registered by the system.

The forward counting mode is also presumed to have been selected for second and third input pulses so that no change occurs in the state of the inverter amplifiers, the control binary flip-flop and the AND gates so that the counter system registers successively a +2 and a +3.

A backward counting mode is assumed for the fourth input pulse. The base of the first inverter amplifier is then negatively biased; as a result, the first inverter amplifier output is grounded and the second inverter amplifier output changes from ground to a negative potential. The Schmitt trigger circuit 80 and a pulse amplifier 81 respond to this potential change on the output of the second inverter amplifier and trigger the binary control flip-flop to its opposite stable state wherein negative and ground potentials are applied to the left-hand and right-hand outputs respectively of the flip-flop. Simultaneous negative potentials are then supplied to AND gate 71 from the output of the second inverter amplifier and the left-hand output of the control flip-flop so that the positive polarity indicator lamp remains energized. The change in state of the control flip-flop, however, causes the reversible counter 10 to count in a backward direction. The system then registers the algebraic value of +2.

The fifth input pulse is also applied when the backward counting mode is selected so that no change takes place in the polarity indicator portion of the system. The system then records an algebraic value of +1.

The sixth input pulse is also applied when the backward counting mode has been selected. Since the counter is operating in the backward counting mode, the count of zero is recorded therein. The zero coincidence circuit hereinabove described then causes the flip-flop to change state as shown in the table above so as to force the counter to count the succeeding seventh input pulse in a forward direction regardless of which counting mode is preselected. The particular polarity indicated for a zero count is dependent upon which mode is preselected by switch 37, a backward counting mode causing the negative indicator lamp to be energized whereas a forward counting mode causes the positive polarity indicator lamp to be energized. Usually, of course, a polarity sign for the count of zero is meaningless and additional circuitry (not shown) responsive to the zero detection circuit 90 may be incorporated in the system herein shown and described for turning both of the polarity indicator lamps OFF for the count of zero.

The seventh input pulse is shown as being applied while the backward counting mode remains selected. The inverter amplifiers thus remain unchanged. The control flip-flop is in the state decreed by the zero coincidence circuit so that the reversible counter must count in a forward direction with the result that the system indicates an algebraic output value of −1.

The eighth input pulse is also applied when the backward counting mode has been preselected. The system accordingly provides an algebraic output value of −2.

The ninth input pulse is applied after the forward counting mode has been preselected. The respective states of the inverter amplifiers are thereupon reversed. The reversal of state of the second inverter amplifier in turn causes the control binary flip-flop to reverse in state. The counter then is caused to count in a reverse direction. Simultaneous negative potentials are, however, not available at either of the AND gates so that the system output is properly recorded as a −1.

The tenth input pulse is applied when the forward counting mode is selected. The reversible counter 10 still counting in a backward direction registers the count of zero whereupon the zero coincidence circuit causes the control flip-flop to reverse in state as shown in the table.

The forward counting mode is preselected as shown for the eleventh input pulse. This operation is completely analogous to the first input pulse with the result that the system records the algebraic value of +1.

There has been disclosed an improved reversible counter system having an algebraic value output. A particular advantage of this invention is that the speed and flexibility of the counting circuitry is in no way affected by the readout indicating circuitry. Thus, both forward and backward input signals are connected directly to the first binary counting unit 16. These signals may be applied just as rapidly as the reversible counter 10 can accept them.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim:

1. A counting apparatus having preselected counting modes of addition and subtraction which displays the output results as an algebraic value comprising a reversible counter indicating the absolute value of said output result, first means for providing mutually exclusive signals determined by the preselected counting mode, second means connected with said counter and responsive to a predetermined count therein, third means connected with said counter, said first means and said second means for controlling the direction of count of said counter and responsive both to said second means and to a change in said first means caused by a change from one counting mode to another counting mode, fourth means connected with said first means and said third means and responsive to a particular one of said signals of said first means and a particular direction of count provided by said third means and also responsive to the other of said signals of said first means and the other direction of count provided by said third means for producing an output signal indicative of one polarity of said output result, and means connected with said fourth means and responsive to the absence of said output signal indicative of said one polarity of the output result for producing an output signal indicative of the other polarity of said output result.

2. The counting apparatus defined in claim 1 wherein said third means comprises a binary flip-flop having a pair of mutually exclusive states, a trigger input coupled to said first means so that said flip-flop is triggered to its opposite state each time the preselected counting mode is changed, a reset input coupled to said second means so that said flip-flop is maintained in a predetermined reset state each time said counter registers said predetermined count, and a pair of output terminals supplied with mutually exclusive potentials indicative of the respective states of said binary flip-flop; means operatively connecting said output terminals to said reversible counter to control the direction of count thereof, said reset state being that one in which the said reversible counter is caused to count in a forward direction.

3. The reversible counter defined in claim 1 wherein said first means comprises a first inverter amplifier, a secnd inverter amplifier connected to the output of said first inverter amplifier, and means connected to the input of said first inverter amplifier for applying different potential signals thereto indicative of the preselected counting mode.

4. The counting apparatus defined in claim 3 comprising means coupled to the output of said second inverter amplifier for providing a signal output each time the potential at the output of said second inverter amplifier changes.

5. A counting apparatus having preselected counting modes of addition and subtraction which displays the output results as an algebraic value comprising a reversible counter indicating the absolute value of said output result, first means for providing mutually exclusive signals determined by the preselected counting mode, second means connected with said counter and responsive to a predetermined count therein, third means connected with said first means and said second means and responsive both to said second means and to a change in said first means caused by a change from one counting mode to another counting mode and having mutually exclusive states determined by said first and second means, means connecting said third means to said reversible counter so that the direction of count thereof is determined by the state of said third means, an AND gate connected to said first means and said third means and responsive to a particular one of said signals of said first means and a particular state of said third means, a second AND gate connected to said first means and said third means and responsive to the other signal of said first means and to the other state of said third means, fourth means connected to said AND gates and responsive to either of said AND gates for indicating a positive polarity for said output result, and fifth means connected to said fourth means and responsive to said fourth means for indicating a negative polarity for said output result whenever neither of said AND gates drives said fourth means.

6. The counting apparatus defined in claim 5 wherein said fourth means comprises an amplifier having its input connected to the outputs of said AND gates and its output connected to a positive polarity readout device, and wherein said fifth means comprises an inverter amplifier having its input connected to the output of the amplifier of said fourth means and its output connected to a negative polarity readout device.

7. An apparatus for adding and subtracting which displays the output result as an absolute value with appropriate sign comprising selection means for preselecting whether the input signal is to be added or subtracted, a counter for selectively counting input signals appearing at a unitary input terminal in forward and reverse directions, detection means connected with said counter for detecting a total count of zero in said counter, control means connected to said counter, said selection means and said detection means for controlling the direction of count in said counter and responsive to said detection means and to said selection means, and means connected to said selection means and said control means and responsive to said control means and said selection means for indicating the appropriate sign.

8. A reversible counter which displays the output as an algebraic value comprising first means for counting input signals appearing at a unitary input terminal in both forward and backward directions and indicating the absolute value of said output algebraic value, second means independent of said input signals for preselecting in which direction an input signal is to be counted, third means connected with said first means and responsive to a predetermined total count in said first means, fourth means connected to said second and third means and responsive thereto and connected to said first means for controlling the direction of counting of said first means, and means coupled to said second means and to said fourth means for indicating the polarity of said output algebraic value.

9. A reversible counter for counting input signals which displays the output as an algebraic value comprising first means for counting input signals appearing at an input terminal thereof in both forward and backward directions and indicating the absolute value of said output algebraic value, second means coupled with said first means for detecting a total count of zero in said first means, forward and backward selection means for preselecting whether the input signals are to be added or subtracted, and control means connected with said first means, said second means and said selection means for responding to said second means and said selection mean for controlling in which direction an input signal is to be counted by said first means.

10. A reversible counter as in claim 9 including means coupled with said selection means and said control means for indicating the polarity of said output algebraic value.

References Cited in the file of this patent

UNITED STATES PATENTS

| | | |
|---|---|---|
| 2,462,275 | Morton et al. | Feb. 22, 1949 |
| 2,789,766 | Wood | Apr. 23, 1957 |
| 2,841,705 | Moerman | July 1, 1958 |
| 2,880,934 | Bensky et al. | Apr. 7, 1959 |
| 2,970,759 | Lanning | Feb. 7, 1961 |
| 3,076,901 | Rubin et al. | Feb. 5, 1963 |